United States Patent [19]

Halder

[11] 3,919,237

[45] Nov. 11, 1975

[54] PREPARATION OF ISOMORPHINAN DERIVATIVE

[75] Inventor: Niklaus Halder, Fullinsdorf, Switzerland

[73] Assignee: Hoffmann-La Roche Inc., Nutley, N.J.

[22] Filed: July 3, 1973

[21] Appl. No.: 376,247

[30] Foreign Application Priority Data
July 7, 1972 Switzerland................ 10202/72
May 21, 1973 Switzerland................ 7121/73

[52] U.S. Cl. .... 260/285; 260/289 D; 286 R; 424/260
[51] Int. Cl.$^2$ ........................ C07D 489/08
[58] Field of Search .................... 260/285

[56] References Cited
UNITED STATES PATENTS
3,634,429  1/1972  Leimgruber et al. ........... 260/285
3,786,054  1/1974  Murakami et al. ............. 260/285

OTHER PUBLICATIONS

Aune, Chemical Abstracts, Vol. 68, 3638d, 1968.
Kitahara et al., Chemical Abstracts, Vol. 70, 58055h, 1969.
Booth et al., Boron Orifluoriell and its Derivatives, 1949, pp. 166–172.

*Primary Examiner*—Donald G. Daus
*Assistant Examiner*—Mary C. Vaughn
*Attorney, Agent, or Firm*—Samuel L. Welt; Bernard S. Leon; Frank P. Hoffman

[57] ABSTRACT

A process for preparing N-substituted isomorphinans via the acid catalyzed cyclization of the appropriately substituted isoquinoline, bearing in the 2-position an electron withdrawing group, utilizing as the cyclization catalyst a mixture of boron trifluoride and a proton/hydronium ion donor, is described. The isomorphinan products so produced are known compounds, useful as analgesic agents.

11 Claims, No Drawings

PREPARATION OF ISOMORPHINAN DERIVATIVE

BACKGROUND OF THE INVENTION

Isomorphinans are a known and useful class of compounds, exhibiting in particular useful analgesic properties. In the past these valuable products have been obtained via expensive, multi-step procedures such as that described in the Journal of The American Chemical Society, 72, 1141 – 1146 (1950). The expense involved and the inefficiency of such multi-step processes has meant that these procedures are not entirely satisfactory or practical for commercial purposes.

DETAILED DESCRIPTION OF THE INVENTION

It has now been found that these valuable isomorphinan products can be obtained by essentially shorter methods and in higher yields. Thus, by the process of the present invention, the isomorphinan end products are prepared by the acid cyclization of an appropriately substituted 1-benzyl-isoquinoline, using a mixture of boron trifluoride and a proton/hydronium ion donor in the liquid phase as the cyclization catalyst. By the method there is obtained an isomorphinan-morphinan mixture with a high concentration of the isomorphinan form, from which the isomorphinan form can be readily isolated and if desired, converted to other products, following conventional techniques.

By following the process of the present invention, there can be obtained isomorphinan derivatives of the formula

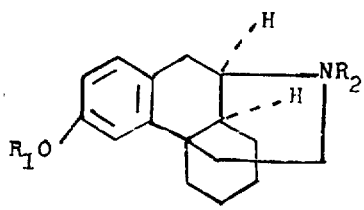 I wherein
- $R_1$ is selected from the group consisting of hydrogen, lower alkyl, cycloalkyl, cycloalkyl-lower alkyl, lower alkenyl, lower alkynyl and lower alkanoyl;
- $R_2$ is selected from the group consisting of hydrogen, lower alkyl, cycloalkyl, cycloalkyl-lower alkyl, lower alkenyl, lower alkynyl and an electron withdrawing group and the pharmaceutically acceptable acid addition salts thereof and the optical antipodes thereof.

As used herein, the term "lower alkyl" either alone or in combination as in cycloalkyl-lower alkyl, refers to straight and branched chain hydrocarbon groups containing from 1 to 8, preferably from 1 to 4, carbon atoms, such as, for example, methyl, ethyl, propyl, isopropyl, butyl, t-butyl, n-pentyl, n-hexyl, n-heptyl, n-octyl and the like. The term "lower alkenyl" includes straight and branched chain hydrocarbon groups containing from 2 to 8 carbon atoms wherein at least one carbon to carbon bond is unsaturated such as allyl, butenyl, dimethylallyl, 3-methyl-2-butenyl and the like. The term "lower alkynyl" refers to groups such as propargyl and the like. The term "cycloalkyl" refers to cyclic hydrocarbon groups containing from 3 to 8 carbon atoms, such as cyclopropyl, cyclobutyl, cyclopentyl, cyclohexyl and the like, with cyclopropyl being preferred. The term "lower alkoxy" refers to both straight and branched chain alkoxy radicals containing from 1 to 7 carbon atoms such as methoxy, ethoxy, propoxy, butoxy, and the like, with methoxy being preferred. The term "lower alkanoyl" refers to the residue of both straight and branched chain aliphatic carboxylic acid moieties containing from 2 to 7 carbon atoms such as acetyl, propionyl, butyryl, pivaloyl, n-hexanoyl, n-heptanoyl and n-octanoyl, with acetyl being preferred. Examples of the electron withdrawing groups or electronegative groups which can be present on the 3-nitrogen include groups such as lower alkanoyl, benzoyl, phenyl-lower alkanoyl, lower alkoxycarbonyl, phenoxycarbonyl, phenyl-lower alkoxycarbonyl, carbamoyl, lower alkyl carbamoyl, and dilower alkyl carbamoyl. If the electron withdrawing group is a lower alkanoyl group, the formyl group is preferred.

Preferred among the compounds falling within the scope of formula I above prepared by the process of the instant invention are the isomorphinan derivatives wherein $R_1$ signifies methyl or acetyl and $R_2$ signifies methyl, allyl, 3-methyl-2-butenyl, or cyclopropylmethyl. Also preferred are th compounds of formula I above wherein $R_1$ and/or $R_2$ signifies hydrogen.

The expression "proton/hydronium ion donor" used herein signifies that the reagent in question acts either as a proton donor or as a proton and hydronium ion donor. The expressions "proton donor" and "hydronium ion donor" are not to be understood as absolute, but must always be put in relation to the conditions momentarily predominant in the reaction system. Thus a proton donor, for example, orthophosphoric acid, forms an adduct with boron trifluoride, for example, according to the following equilibrium reaction:

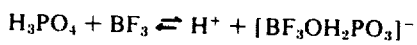

The so-formed adduct is considerably more acidic than the corresponding proton donor alone. When more thann one mole equivalent of orthophosphoric acid is added per mole equivalent of boron tri-fluoride, only the first mole equivalent of orthophosphoric acid acts as a proton donor; the excess orthophosphoric acid acts as a proton acceptor in relation to the strongly acidic adduct. As a result of the addition of the excess orthophosphoric acid, the percentage proportion of the isomorphinan form in the cyclization product is detrimentally affected. Therefore, no more than about one mole equivalent of orthophosphoric acid should be used per mole of boron trifluoride.

Other proton donors which also form adducts with the boron trifluoride behave similarly, for example

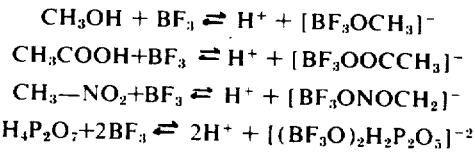

When water is used as the proton/hydronium ion donor, the first two mole equivalents of water per mole equivalent of boron trifluoride act as proton and hydronium ion donors according to the equilibrium reactions:

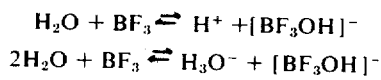

It is possible to add up to about two mole equivalents of water per mole equivalent of boron trifluoride without detrimentally affecting the percentage proportion of the isomorphinan form in the cyclization product. With the addition of more than 2 mole equivalents of water per mole equivalent of boron trifluoride, the water present in excess of 2 mole equivalents acts exclusively as a proton acceptor and results in the percentage proportion of the isomorphinan form in the cyclization product being reduced. Therefore, no more than about 2 mole equivalents of water should be used per mole equivalent of boron trifluoride.

The proton/hydronium ion donor can also consist of a mixture of substances. A preferred mixture consists of a hydrogen halide, especially hydrogen fluoride, and water. The hydrogen halide is preferably mixed with water, thus enabling the formation of a liquid phase after the addition thereto of boron trifluoride. In so doing, up to about 2 mole equivalents of proton/hydronium ion donor (e.g. hydrogen halide + water) can be added per mole equivalent of boron trifluoride without the percentage proportion of the isomorphinan form in the cyclization product being detrimentally affected, for example:

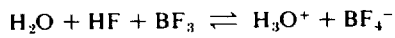

One mole equivalent of hydrogen halide and 1 mole equivalent of water per mole equivalent of boron trifluoride act as proton/hydronium ion donor. If more hydrogen halide and/or water is/are added, the excess portion acts exclusively as proton acceptor and results in that the percentage proportion of the isomorphinan form in the cyclization product is reduced. Therefore, no more than about 2 mole equivalents of hydrogen halide and water in total should be used per mole equivalent of boron trifluoride.

As can be seen from the above discussion, the term "proton/hydronium ion donor" encompasses, for example, the following compounds: mineral acids such as orthophosphoric acid and pyrophosphoric acid; alkanols with 1–4 carbon atoms such as methanol, ethanol, n-butanol, sec-butanol, and t-butanol; alkane carboxylic acids with 1–4 carbon atoms such as formic acid, acetic acid, propionic acid, n-butyric acid, isobutyric acid and pivalic acid; nitro-alkanes with 1–4 carbon atoms such as nitromethane and nitroethane. With these proton donors, a mole equivalent ratio between the proton donor and boron trifluoride of about 1:1 is preferably employed.

As stated above, water acts as a proton donor as well as a hydronium ion donor. A mole equivalent ratio between water and boron trifluoride of about 1:1 is preferred, although a ratio of up to about 2:1 can also be used.

Hydrogen halides such as hydrogen chloride, hydrogen bromide, hydrogen iodide or, especially, hydrogen fluoride, are preferably used with water as the proton/hydronium ion donor. When using this combination, preferably about 1 mole equivalent of hydrogen halide and about 1 mole equivalent of water are used together per mole equivalent of boron trifluoride.

Thus, in following the instant process, the desired isomorphinans of formula I above are prepared by the acid catalyzed cyclization of an isoquinoline represented by the formulas

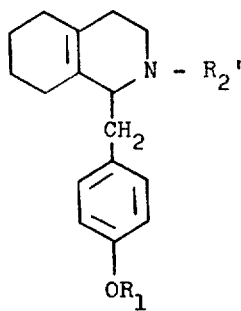

IIa

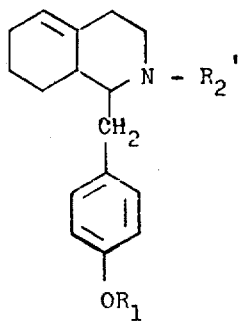

IIb

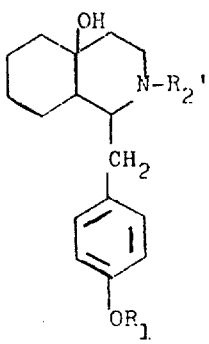

IIc

In each of Formulas IIa, IIb and IIc above, $R_1$ is as described above, and $R_2$ signifies an electron withdrawing group, preferably formyl. A mixture of boron trifluoride and a proton/hydronium ion donor is employed as the cyclization catalyst.

The temperature at which the catalyzed cyclization is effected is not a critical parameter. Temperatures in the range of between 0C and the reflux temperature of the reaction mixture are expediently employed, with room temperature often being sufficient to bring the reaction to an end in a short time. It is sometimes advantageous to work in an inert gas atmosphere, e.g. under nitrogen or argon.

The cyclization of the isoquinoline of formulae IIa – IIc above yields a mixture of both isomorphinan/morphinan forms in which a high (up to 60-70%) proportion of the isomorphinan form is present. On the other hand, if an acid, e.g. ortho- or poly-phosphoric acid, is used alone as the cyclization catalyst, the proportion of isomorphinan present in the reaction product is only about 5-10%.

The desired isomorphinan derivative formed upon cyclization can be isolated from the cis/trans-mixture obtained following conventional techniques. For example, this isolation can be effected by fractional crystallization of an acid addition salt of the isomorphinan, e.g. the hydrochloride, from a lower alkanol, e.g. methanol or ethanol. The separation can also be effected in other ways familiar to one skilled in the art, e.g. by column chromatography of the free base on a suitable carrier such as aluminum oxide, silica gel or magnesium silicate.

As is obvious from the structure of the compounds of formula I above, the isomorphinan derivatives prepared by the inventive process can exist in racemic form or as their optical antipodes. In the event an optical antipode rather than the racemate is the desired end product, some of the intermediates or the final products can be resolved by means well known in the art, for example, by formation of the brucine salt or the diastereomeric salts like the tartrate salt or the di-(p-toluoyl)-tartrate salt. It is advantageous to resolve the required starting materials at the outset into the dextro- or levo- rotary forms, depending upon the desired absolute configuration of the end product.

The compounds of formula I above form pharmaceutically acceptable acid addition salts with inorganic or organic acids. These pharmaceutically acceptable acid addition salts can be prepared by reacting the isomorphinan base with an organic or inorganic acid, preferably in the presence of an inert solvent such as a lower alkanol, e.g. ethanol, or acetonitrile. Suitable inorganic acids for this purpose include hydrohalic acids such as hydrochloric acid and hydrobromic acid while suitable organic acids include tartaric acid, citric acid, oxalic acid, maleic acid, fumaric acid and the like.

The isomorphinan derivative formed upon cyclization of an isoquinoline of formulae IIa – IIc above bears an electron withdrawing group on the nitrogen atom. A variety of substituents can then be introduced onto the nitrogen or into the 3-position following conventional techniques. For example, if the electron withdrawing group on the nitrogen is a lower alkanoyl group, e.g. formyl or acetyl, this group can be saponified by warming with an alkali metal hydroxide in a lower alkanol, e.g. potassium hydroxide in ethanol. If it is desired to prepare a compound of formula I wherein $R_1$ signifies lower alkanoyl, the substituent in the 3-position can be converted to a hydroxy group as described below and the 3-hydroxy compound is then reacted with an acid halide or acid anhydride of the corresponding alkane carboxylic acid in the presence of a tertiary organic base such as e.g. triethylamine or pyridine. If an isomorphinan with a basic nitrogen is present, the phenolic hydroxy group is preferably converted into the corresponding phenolate before the alkanoylation.

When $R_1$ signifies lower alkyl, cycloalkyl, cycloalkyl-lower alkyl, lower alkenyl or lower alkynyl, the $R_1$ group can be cleaved to yield the corresponding 3—OH compound by warming, preferably at reflux temperature, with concentrated aqueous hydrobromic acid. Instead of the hydrobromic acid an acid addition salt of pyridine, e.g. the hydrochloride, can also be used as the ether cleaving agent.

The electron withdrawing group $R_2$, for example a lower alkanoyl group, can be cleaved, e.g. by warming with an alkali metal hydroxide in a lower alkanol e.g. potassium hydroxide in ethanol.

If it is desired to prepare an isomorphinan derivative wherein $R_1$ signifies cycloalkyl, cycloalkyl-lower alkyl, lower alkenyl, or lower alkynyl, this group can be introduced by treating a 3-hydroxyisomorphinan prepared as described above with alkali and subsequently with a halide of the desired substituent, e.g. a cycloalkyl halide, to provide the desired $R_1$ group. Other conventional methods may also be employed, e.g. treatment with diazomethane or with phenyl-trialkyl (or trialkenyl) ammonium hydroxide.

When it is desired to prepare a compound of formula I wherein $R_2$ signifies lower alkyl, cycloalkyl, cycloalkyl-lower alkyl, lower alkenyl or lower alkynyl, the desired $R_2$ substituent can be introduced, e.g. by reacting the corresponding N-unsubstituted isomorphinan with the corresponding halide. Other suitable methods are, for example, the reaction with formaldehyde and water in the presence of a noble metal catalyst, such as Raney nickel, or the reduction of the corresponding N-acyl compound with lithium aluminum hydride.

The isomorphinan derivatives prepared by the inventive process are known compounds with pharmacological, e.g. analgesic, properties and are thus useful as analgesic agents. Many of the compounds of formula I are also useful as intermediates in the manufacture of compounds with pharmacological properties. As an example, the compounds of formula I, wherein $R_2$ represents an electronegative group, can be converted into pharmacologically valuable compounds having the above mentioned properties by splitting off the group $R_2$ and subsequently alkylating the nitrogen atom.

The following Examples are illustrative but not limitative of the present invention. All temperatures are given in degrees Centigrade:

EXAMPLE 1

28.5 g. of ( )-1-(p-methoxybenzyl)-N-formyl-1,2,3,4,5,6,7,8-octahydro-isoquinoline and 514 g. of boron trifluoride/orthophosphoric acid are kept in a nitrogen atmosphere 15 minutes at about 40C. and 24 hours at 22C. The reaction mixture is placed in a separating funnel and the reaction vessel is rinsed with 20 ml. of benzene and subsequently with 20 ml. of water. After addition of 250 g. of ice the mixture is washed once with 250 ml. and twice with 200 ml. of benzene each time. The benzene extracts aare successively washed with 100 ml. of water each time. The combined benzene solutions are evaporated under reduced pressure. 28-30 g. of a crude cyclization product are obtained which consist of about 60% of ( )-3-methoxy-N-formyl-isomorphinan, about 20% of ( )-3-methoxy-N-formyl-morphinan and about 20% of ( )-10-methoxy-N-formyl-apomorphinan.

EXAMPLE 2

In a pressure vessel provided with a stirrer, 23.2 g. of potassium hydroxide in 90 ml. of water are kept for 48 hours at 100C. with about 29 g. of the crude cyclization product obtained in Example 1 and 160 ml. of ethanol. The reaction mixture is subsequently evaporated under reduced pressure. The residue is rinsed into a separating funnel with the aid of 80 ml. of benzene and 40 ml. of water. The mixture is shaken and the aqueous phase is extracted once again with 80 ml. of benzene. The benzene extracts are washed again twice with 25 ml. of 5% sodium chloride solution each time. The benzene solutions are evaporated under reduced pressure and the residue is distilled under strongly reduced pressure. 23.4–24.0 g. of product are obtained which, by gas chromatography, are shown to consist of about 60% of ( )-3-methoxy-isomorphinan, about 20% of ( )-3-methoxy-morphinan and about 20% of ( )-10-methoxy-apomorphinan. The boiling point under strongly reduced pressure is 140–175C.

EXAMPLE 3

23.5 g. of the distilled saponification product obtained from Example 2 are mixed with 150 ml. of ethanol and 15 ml. of 25% ethanolic hydrochloric acid and kept 45 minutes at 0C. The precipitated crystals are filtered off on a suction filter. The crystalline mass on the suction filter is washed twice with 15 ml. of ice-cold ethanol each time and dried 15 hours at 50C. under reduced pressure. 14–17 g. of ( )-3-methoxy-isomorphinan hydrochloride are obtained having a purity of about 80% according to the gas chromatogram of the released base.

EXAMPLE 4

15.0 g. of the crude ( )-3-methoxy-isomorphinan hydrochloride obtained according to Example 3 are dissolved under reflux conditions in 150 ml. of methanol. The hot solution is filtered and allowed to stand 5 hours at room temperature and subsequently 16 hours at 20C. The obtained crystals are filtered off and washed twice with 15 ml. of ice-cold methanol each time. The crystals are dried 5 hours at 50C. under reduced pressure.

The mother liquor is evaporated and the residue is dissolved under reflux conditions in about 70 ml. of methanol. After crystallization and filtration as described above, and washing the crystals twice with 7 ml. of ice-cold methanol each time followed by 5 hours of drying at 50C. under reduced pressure, a second crystallizate is obtained.

Yield:
Crystallizate 1: ca. 7.5 g. of ( )-3-methoxy-isomorphinan hydrochloride
Crystallizate 2: ca 2.5 g. of ( )-3-methoxy-isomorphinan hydrochloride
Total ca. 10.0 g. of ( )-3-methoxy-isomorphinan hydrochloride of a purity of ca. 98% according to the thin-layer chromatogram.

The mother liquor further contains about 1.5 g. of ( )-3-methoxy-isomorphinan hydrochloride.

EXAMPLE 5

10.0 g. of the 98% pure ( )-3-methoxy-isomorphinan hydrochloride obtained according to Example 4 are dissolved under reflux conditions in 110 ml. of methanol, crystallized in the manner given in Example 4 and filtered. The crystals are washed twice with 10 ml. of ice-cold methanol each time and dried 5 hours at 50C. under reduced pressure.

The mother liquor is evaporated and dissolved under reflux conditions in about 54 ml. of methanol. The crystallization and filtration are carried out in the manner given in Example 4. The crystals obtained are washed twice with 7 ml. of ice-cold methanol each time and dried 5 hours at 50C. under reduced pressure.

Yield:
Crystallizate 1: ca. 5.2 g. of ( )-3-methoxy-isomorphinan-hydrochloride
Crystallizate 2: ca. 2.1 g. of ( )-3-methoxy-isomorphinan hydrochloride
Total ca 7.3 g. of ( )-3-methoxy-isomorphinan-hydrochloride.

The purity of this product amounted to 99–100% according to thin-layer chromatogram. $[\ ]_D^{20}$ (c = 1 in methanol): 27.7 ω 0.2.

The mother liquor further contains about 2.5 g. of ( )-3-methoxy-isomorphinan-hydrochloride.

The pure (99–100%) ( )-3-methoxy-isomorphinan-hydrochloride (ca. 7.3 g.) so-obtained corresponds to a yield of ca. 28% with respect to the ( )-1-(p-methoxybenzyl)-N-formyl-1,2,3,4,5,6,7,8-octahydroisoquinoline. This yield can be increased to ca. 35% by utilizing the two mother liquor residues.

EXAMPLE 6

In a 1500 ml. sulfonating flask with stirrer, dropping funnel, thermometer and boron trifluoride delivery tube containing 485 ml. of methanol, 816 g. of boron trifluoride are led in while stirring vigorously and cooling with ice. 114 g. of ( )-1-(p-methoxybenzyl)-N-formyl-1,2,3,4,5,6,7,8-octahydroisoquinoline prewarmed to about 40C. are added at once through the dropping funnel. The temperature of the reaction mixture is kept at 20C. by cooling, and the reaction mixture is stirred 14 hours at 20C. Subsequently the reaction mixture is poured into a 3-liter separating funnel, mixed with 400 ml. of ice and 400 ml. of water and shaken once with 1000 ml. of benzene and subsequently twice with 800 ml. of benzene each time. The combined benzene extracts are washed three times with 100 ml. of water each time and evaporated under reduced pressure. 128 g. of crude cyclization product are obtained which consist of about 65% of ( )-3-methoxy-N-formyl-isomorphinan, about 17% of ( )- 3-methoxy-N-formyl-morphinan and about 18% of ( )-10-methoxy-N-formyl-apomorphinan.

After hydrolysis of this cyclization product as described in Example 2, 86.0 g. of a mixture are obtained containing about 65% of ( )-3-methoxy-isomorphinan, about 17% of ( )-3-methoxy-morphinan and about 18% of (31 )-10-methoxy-apomorphinan. This mixture is precipitated as the hydrochloride in the same manner as in Example 3 and crystallized in the same manner as in Examples 4 and 5. 43.0 g. of ( )-3-methoxy-isomorphinan-hydrochloride are obtained having a purity, measured in gas chromatogram, of 99–100%. $[\ ]_n^{20}$ (c = 1 in methanol): 27.5 ω 0.2. The yield obtained corresponds to 36–37% with respect to the ( )-1-(p-methoxybenzyl)-N-formyl-1,2,3,4,5,6,7,8-octahydro-isoquinoline employed as starting material.

EXAMPLE 7

In a 500 ml. sulfonating flask with stirrer, dropping funnel, thermometer and boron trifluoride delivery tube containing 183 g. of nitromethane, 816 g. of boron trifluoride are led in while stirring vigorously and cooling with ice. 28.5 g. of ( )-1-(p-methoxybenzyl)-N-formyl-1,2,3,4,5,6,7,8-octahydro-isoquinoline prewarmed to about 40C. are added at once through the dropping funnel. The reaction mixture is stirred 4 hours at 20C. and thereafter worked up in analogy to Example 6. About 30 g. of a crude cyclization product are obtained which consist of about 62% of ( )-3-methoxy-N-formyl-isomorphinan, about 28% of ( )-3-methoxy-N-formyl-morphinan and about 10% of ( )-10-methoxy-N-formyl-apomorphinan.

Pure ( )-3-methoxy-isomorphinan can be obtained from this mixture by hydrolysis and subsequent purification as described in Examples 2, 3, 4 and 5.

EXAMPLE 8

In a sulfonating flask provided with stirrer, dropping funnel, thermometer and boron trifluoride delivery tube containing 107.5 g. of water, 408 g. of boron trifluoride are led in while stirring vigorously and cooling with ice. 28.5 g. of ( )-1-(p-methoxybenzyl)-N-formyl-1,2,3,4,5,6,7,8-octahydro-isoquinoline are added at once through the dropping funnel. The reaction mixture is strirred 2 hours at 20C. and thereafter worked up in analogy to Example 6. About 30 g. of a crude cyclization product are obtained which consist of about 62% ( )-3-methoxy-N-formyl-isomorphinan, about 12% of ( )-3-methoxy-N-formyl-morphinan and about 26% of ( )-10-methoxy-N-formyl-apomorphinan.

Pure ( )-3-methoxy-isomorphinan can be obtained from this mixture by hydrolysis and subsequent purification as described in Examples 2, 3, 4 and 5.

EXAMPLE 9

In a paraffin flask provided with stirrer, dropping funnel, thermometer and boron trifluoride delivery tube containing 75 g. of 80% hydrofluoric acid (d = 1.22) and 39 g. of water, 204 g. of boron trifluoride are led in while stirring vigorously and cooling with ice. 28.5 g. of ( )-1-(p-methoxybenzyl)-N-formyl-1,2,3,4,5,6,7,8-octahydro-isoquinoline prewarmed to about 40C. are added at once to the reaction mixture. The reaction mixture is stirred hour at 20C. and thereafter worked up in analogy to Example 6. About 30 g. of a crude cyclization product are obtained which consist of about 68% of ( )-3-methoxy-N-formyl-isomorphinan, about 9% of ( )-3-methoxy-N-formyl-morphinan and about 23% of ( )-10-methoxy-N-formyl-apomorphinan.

Pure ( )-3-methoxy-isomorphinan can be obtained from this mixture by hydrolysis and subsequent purification as described in Examples 2, 3, 4 and 5.

EXAMPLE 10

In a sulfonating flask provided with stirrer, dropping funnel, thermometer and delivery tube containing 180 g. of glacial acetic acid, 204 g. of boron trifluoride are led in while stirring vigorously and cooling with ice. 28.5 g. of ( )-1-(p-methoxybenzyl)-N-formyl-1,2,3,4,5,6,7,8-octahydro-isoquinoline are added at once through the dropping funnel. The reaction mixture is stirred 4 hours at 40C. and thereafter worked up in analogy to Example 6. About 30 g. of a crude cyclization product are obtained which consist of about 60% of ( )-3-methoxy (hydroxy)-N-formyl-isomorphinan, about 15% of ( )-3-methoxy (hydroxy)-N-formyl-morphinan and about 25% of ( )-10-methoxy (hydroxy)-N-formyl-apomorphinan.

Pure ( )-3-methoxy-isomorphinan can be obtained from this mixture by hydrolysis and subsequent methylation under reflux with phenyltrimethyl-ammonium chloride and sodium hydroxide in benzene as well as purification as described in Examples 2, 3, 4 and 5.

EXAMPLE 11

In a sulfonating flask provided with stirrer, dropping funnel, thermometer and boron trifluoride delivery tube containing 534 g. of pyrophosphoric acid, 407 g. of boron trifluoride are led in while stirring vigorously and cooling with ice. 28.5 g. of ( )-1-(p-methoxybenzyl)-N-formyl-1,2,3,4,5,6,7,8-octahydro-isoquinoline are added at once through the dropping funnel. The reaction mixture is stirred 1 hour at 20C. and thereafter worked up in analogy to Example 6. About 30 g. of a crude cyclization product are obtained which consist of about 54% of ( )-3-methoxy-N-formyl-isomorphinan, about 11% of ( )-3-methoxy-N-formyl-morphinan and about 35% of ( )-10-methoxy-N-formyl-apomorphinan.

Pure ( )-3-methoxy-isomorphinan can be obtained from this mixture by hydrolysis and subsequent purification as described in Examples 2, 3, 4 and 5.

EXAMPLE 12

In a sulfonating flask provided with stirrer, dropping funnel, thermometer and boron trifluoride delivery tube containing 107.5 g. of water, 204 g. of boron trifluoride are led in while stirring vigorously and cooling with ice. 28.5 g. of ( )-1-(p-methoxybenzyl)-N-formyl-1,2,3,4,5,6,7,8-octahydro-isoquinoline are added at once through the dropping funnel. The reaction mixture is stirred 24 hours at 22C. and thereafter worked up in analogy to Example 6. After 24 hours 25% of the starting product had reacted. The isomer ratio was: ( )-3-methoxy-N-formyl-isomorphinan 60%; ( )-3-methoxy-N-formyl-morphinan 35%; ( )-10-methoxy-N-formyl-apomorphinan 5%.

Pure (−)-3-methoxy-isomorphinan can be obtained from the obtained mixture by hydrolysis and subsequent purification as described in Examples 2, 3, 4 and 5.

I claim:

1. A process for preparing an isomorphinan of the formula

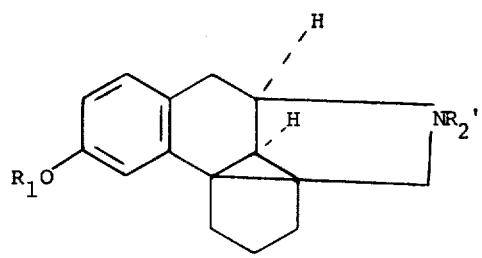

wherein $R_1$ is selected from the group consisting of hydrogen, $C_1$ to $C_8$ lower alkyl, $C_3$ to $C_8$ cycloalkyl, $C_3$ to $C_8$ cycloalkyl—$C_1$ to $C_8$ lower alkyl, $C_2$ to $C_8$ lower alkenyl, propargyl, and the residue of both straight and branched chain carboxylic acid moieties of 2 to 7 carbon atoms and $R_2'$ is an electron withdrawing group selected from the group consisting of lower alkanoyl, benzoyl, phenyl-lower alkanoyl, lower alkoxycarbonyl, phenoxycarbonyl, phenyl-lower alkoxycarbonyl, carbamoyl, $C_1$ to $C_8$ lower alkyl carbamoyl and $C_1$ to $C_8$ dilower alkyl carbamoyl wherein lower alkanoyl is the residue of both straight and branched chain carboxylic acid moieties of 2 to 7 carbon atoms, which consists essentially of the steps of cyclizing an isoquinoline represented by the formulae

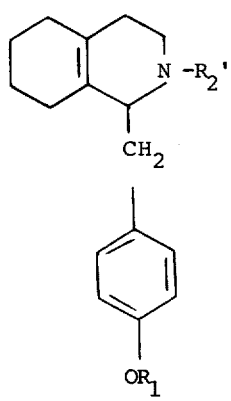 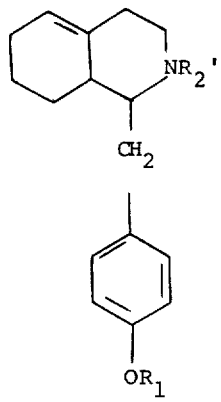 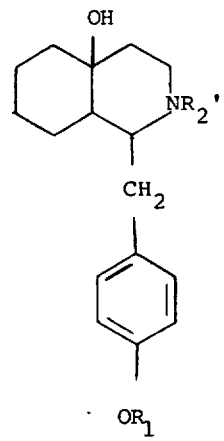

wherein $R_1$ and $R_2'$ are as described above using as the cyclization catalyst a mixture of boron trifluoride and a proton/hydronium ion donor said mixture containing no more than about 1 mole equivalent of proton donor or no more than about 2 mole equivalents of proton and hydronium ion donor per mole equivalent of boron trifluoride, and isolating the resulting cyclization product.

2. The process of claim 1 wherein the $R_1$ substituent is a lower alkyl group and the $R_2$ substituent is a lower alkanoyl group.

3. The process of claim 2 wherein the lower alkyl group is methyl and the lower alkanoyl group is formyl.

4. The process of claim 1 wherein the proton donor employed is selected from the group consisting of a mineral acid selected from the group consisting of ortho-phosphoric acid and pyrophosphoric acid, a $C_1$ to $C_4$ alkane carboxylic acid, a $C_1$ to $C_4$ lower alkanol and a $C_1$ to $C_4$ nitroalkane.

5. The process of claim 4 wherein the mineral acid is orthophosphoric acid.

6. The process of claim 4 wherein the alkane carboxylic acid used is acetic acid.

7. The process of claim 4 wherein the lower alkanol employed is methanol.

8. The process of claim 4 wherein the nitroalkane employed is nitromethane.

9. The process of claim 1 wherein water is used as the proton/hydronium ion donor.

10. The process of claim 1 wherein a mixture of a hydrogen halide and water is used at the proton/hydronium ion donor.

11. The process of claim 10 wherein hydrogen fluoride is used as the hydrogen halide.

* * * * *

UNITED STATES PATENT OFFICE
CERTIFICATE OF CORRECTION

Patent No. 3,919,237　　　　　　　　Dated November 11, 1975

Inventor(s) Niklaus Halder

It is certified that error appears in the above-identified patent and that said Letters Patent are hereby corrected as shown below:

Column 12, claim 2, line 30 the term "$R_2$"

should be $R_2'$

Signed and Sealed this

Seventh Day of September 1976

[SEAL]

Attest:

RUTH C. MASON
*Attesting Officer*

C. MARSHALL DANN
*Commissioner of Patents and Trademarks*